United States Patent Office 3,257,442
Patented June 21, 1966

3,257,442
AMINOALKYL GLYCOL MONOBORATE ESTERS
William G. Woods, Anaheim, William David English, Orange, and Irving S. Bengelsdorf, Costa Mesa, Calif., assignors to United States Borax & Chemical Corporation, Los Angeles, Calif., a corporation of Nevada
No Drawing. Filed Nov. 21, 1961, Ser. No. 154,068
13 Claims. (Cl. 260—462)

The present invention relates as indicated to aminoalkyl glycol monoborate esters and has further reference to a method for preparing the same.

It is, therefore, the principal object of this invention to provide as new compounds the aminoalkyl glycol monoborate esters.

It is a further object of this invention to provide an efficient and economically desirable method for preparing the aminoalkyl glycol monoborate esters.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the aminoalkyl glycol monoborate esters having the formula

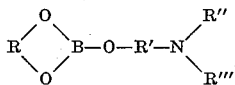

where R is an alkylene radical of from 2 to 4 carbon atoms in length and containing a total of from 2 to 20 carbon atoms, R' is an alkylene radical of from 2 to 3 carbon atoms in length and containing a total of from 2 to 4 carbon atoms, and R'' and R''' are materials selected from the group consisting of hydrogen and alkyl radicals of from 1 to 18 carbon atoms.

The aminoalkyl glycol monoborate esters of the present invention will be found to have numerous and varied industrial applications. These compounds are excellent epoxy resin curing agents, and can be used in the production of other resins, adhesives and coating compositions. They can also be used as antigumming agents for lubricating oils, as fuel additives which increase the efficiency of internal combustion engines, as corrosion inhibitors for hydraulic fluid systems, and as chemical intermediates in the preparation of other desirable organoboron compounds.

The method for preparing the aminoalkyl monoborate esters can best be illustrated by the following equations:

(1)
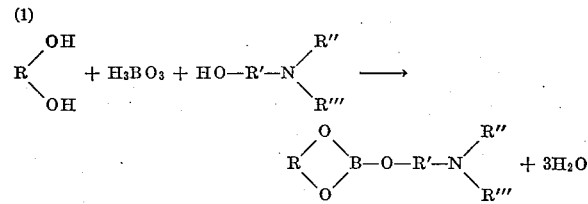

(2)
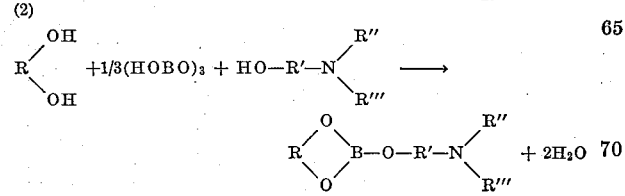

(3)
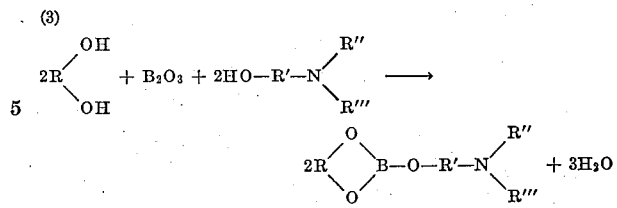

where R, R', R'' and R''' are as defined in the foregoing broadly stated paragraph. The reaction will proceed when there is an excess of reactants. Such excess, however, tends to interfere with separating the desired product from the reaction mass, and for the sake of economy and ease of separation, in the preferred embodiment of the invention, we use stoichiometric amounts of the reactants.

The preferred method for performing the above reaction is a direct single-step process which involves admixing an aminoalkanol, a glycol and orthoboric acid, metaboric acid, or boron oxide in the presence of a hydrocarbon solvent which will form an azeotrope with the water of reaction. The admixture is then heated under reflux for several hours to complete the reaction, and the water-hydrocarbon solvent azeotrope is removed by distillation. Any excess solvent present is then removed from the remaining reaction mass by distillation and the desired aminoalkyl glycol monoborate ester is recovered as the residue.

We have found that the removal of the water of reaction is greatly facilitated when an excess of the azeotroping agent is present, and in the preferred embodiment of the invention we use from about 1 to 5 or more volumes of hydrocarbon solvent per volume of reactants present. Such common solvents as benzene, n-heptane, toluene, aliphatic naphtha and xylene are illustrative of a few of the hydrocarbon solvents applicable, as azeotroping agents, to the present process.

The aminoalkanols applicable to the present invention have the formula

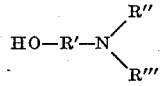

where R' is an alkylene radical of from 2 to 3 carbons in length and containing a total of from 2 to 4 carbon atoms, and R'' and R''' can be either hydrogen or alkyl radicals of from 1 to 18 carbon atoms. The aminoalkanols, therefore, can be either primary aminoalkanols where R' is the defined alkylene radical and R'' and R''' are both hydrogen, or secondary aminoalkanols where R' is the defined alkylene radical and either R'' or R''' is hydrogen while the other is an alkyl radical, or tertiary aminoalkanols where R' is the defined alkylene radical and R'' and R''' are both alkyl radicals.

The following list is illustrative of the aminoalkanols applicable to the present invention:

Primary amine function:
    2-aminoethanol
    3-aminopropanol
    1-amino-2-propanol
    1-amino-2-methyl-2-propanol
    1-amino-2-butanol
Secondary amine function:
    N-propyl-2-aminoethanol
    N-(2-ethylhexyl)3-aminopropanol
    N-ethyl-3-aminopropanol
    N-t-butyl-1-amino-2-propanol
    N-methyl-1-amino-2-methyl-2-propanol
    N-octadecyl-2-aminoethanol
    N-isopropyl-1-amino-2-propanol
Tertiary amine function:

N,N-dimethyl-2-aminoethanol
N,N-diisopropyl-1-amino-2-propanol
N,N-di(2-ethylhexyl)-2-aminoethanol
N,N-di-n-amyl-3-aminopropanol
N,N-di-n-butyl-3-aminopropanol
N,N-diethyl-1-amino-2-methyl-2-propanol
N,N-di-n-hexyl-1-amino-2-propanol
N,N-di-n-propyl-1-amino-2-butanol The glycols applicable to the present invention are diols containing from 2 to 20 carbon atoms in which 2 to 4 carbon atoms separate the two hydroxyl groups. The following are illustrative of these glycols:

1,2-butanediol
1,3-butanediol
1,4-butanediol
2,3-butanediol
1,2-propanediol
1,3-propanediol
Cis-1,4-butene-2-diol
1,2-ethanediol
2-methyl-2,4-pentanediol
Cis-4,5-di(hydroxymethyl)cyclohexene
2,2-dimethyl-1,3-butanediol
2-ethyl-1,3-hexanediol
2-methyl-2-ethyl-1,3-propanediol
Endo-cis-2,3-dihydroxymethylbicyclo-[2.2.1]hept-5-ene It is to be clearly understood that the foregoing lists are only a partial enumeration of the reactants applicable to the present invention and are in no way intended to limit the invention.

So that the present invention is more clearly understood, the following examples are given for illustrative purposes:

I

A mixture of 103.2 grams (1.00 mole) of N,N-dimethyl-1-amino-2-propanol, 61.84 grams (1.00 mole) of boric acid and 90.12 grams (1.00 mole) of 2,3-butanediol was placed in a 2 liter round-bottomed flask containing 400 ml. of benzene. The flask was equipped with a reflux condenser, a Dean-Stark trap and a magnetic stirrer, and was heated for about 8 to 10 hours under reflux at which time the theoretical amount of water, 54 ml., had been removed. The excess benzene was then removed by distillation and 149.4 grams (74.3% yield) of 2-($\beta$-dimethylaminoisopropoxy)-4,5-dimethyl-1,3,2-dioxaborolane was recovered, B.P. 131–132° C. (33–8.5 mm.), $n_D$ (24.5° C.)=1.452. Chemical analysis of the product yielded the following data:

Calculated for $C_9H_{20}BNO_3$: B=5.38%, N=6.97%. Found in product: B=5.69%, N=6.98%.

II

A mixture of 145.2 grams (1.00 mole) of N,N-diisopropyl-2-aminoethanol, 61.84 grams (1.00 mole) of boric acid and 62.1 grams (1.00 mole) of 1,2-ethanediol was placed in a 2 liter round-bottomed flask containing 500 ml. of benzene. The flask was equipped with a reflux condenser, a Dean-Stark trap and a magnetic stirrer, and was heated for about 12 hours under reflux at which time the theoretical amount of water, 54 ml., had been removed. The excess benzene was then removed by distillation and 158.2 grams (73.5% yield) of 2-($\beta$-diisopropylaminoethoxy)-1,3,2-dioxaborolane was recovered, B.P. 123° C. (4.1–3.5 mm.), $n_D$ (21° C.)=1.467. Chemical analysis of the product yielded the following data:

Calculated for $C_{10}H_{22}BNO_3$: B=5.03%, N=6.51%. Found in product: B=5.04%, N=6.42%.

III

A mixture of 178 grams (2.0 mole) of N,N-dimethyl-2-aminoethanol, 70 grams (1.0 mole) of boron trioxide and 180 grams (2.0 mole) of 1,3-butanediol was placed in a 2 liter round-bottomed flask containing 500 ml. of benzene. The flask was equipped with a reflux condenser, a Dean-Stark trap and a magnetic stirrer, and was heated for 6 hours under reflux at which time the theoretical amount of water, 54 ml., had been removed. The excess benzene was then removed by distillation and 245.9 grams (65.7% yield) of 2-($\beta$-dimethylaminoethoxy)-4-methyl-1,3,2-dioxaborinane was recovered, B.P. 93° C. (7–2.5 mm.), $n_D$ (23.5° C.)=1.438. Chemical analysis of the product yielded the following data:

Calculated for $C_8HB_{18}BNO_3$: B=5.79%, N=7.49%. Found in product: B=5.78%, N=7.63%.

IV

A mixture of 173.3 grams (1.00 mole) of N,N-dibutyl-2-aminoethanol, 61.84 grams (1.00 mole) of boric acid and 90.1 grams (1.00 mole) of 1,3-butanediol was placed in a 2 liter round-bottomed flask containing 500 ml., of aliphatic naphtha. The flask was equipped with a reflux condenser, a Dean-Stark trap and a magnetic stirrer, and was heated for about 2 hours under reflux at which time the theoretical amount of water, 54 ml., had been removed. The excess aliphatic naphtha was then removed by distillation and 249.5 grams (92.0% yield) of 2-($\beta$-di-n-butylaminoethoxy)-4-methyl-1,3,2-dioxaborinane was recovered, B.P. 105–110° C. (0.40–0.55 mm.), $n_D$ (21° C.)=1.446. Chemical analysis of the product yielded the following data:

Calculated for $C_{14}H_{30}BNO_3$: B=3.99%, N=5.16%, C=62.00%, H=11.15%. Found in product: B=4.05%, N=5.09%, C=62.15%, H=11.19%.

V

A mixture of 98 grams (1.10 mole) of N,N-dimethyl-2-aminoethanol, 61.84 grams (1.00 mole) of boric acid and 118.2 grams (1.00 mole) of 2-methyl-2,4-pentanediol was placed in a 2 liter round-bottomed flask containing 400 ml., of benzene. The flask was equipped with a reflux condenser, a Dean-Stark trap and a magnetic stirrer, and was heated for about 7 hours under reflux at which time the theoretical amount of water, 54 ml., had been removed. The excess benzene was then removed by distillation and 174.2 grams (81.0% yield) of 2-($\beta$-dimethylaminoethoxy)-4,4,6-trimethyl-1,3,2-dioxaborinane was recovered, B.P. 53° C. (0.10–0.13 mm.), $n_D$ (23° C.) =(1.434). Chemical analysis of the product yielded the following data:

Calculated for $C_{10}H_{22}BNO_3$: B=5.03%, N=6.51%. Found in product: B=5.03%, N=6.54%.

VI

A mixture of 86.65 grams (0.50 mole) of N,N-dibutyl-2-aminoethanol, 30.92 grams (0.50 mole) of boric acid and 59.09 grams (0.50 mole) of 2-methyl-2,4-pentanediol was placed in a 2 liter round-bottomed flask containing 450 ml. of toluene. The flask was equipped with a reflux condenser, a Dean-Stark trap and a magnetic stirrer, and was heated for about 4 hours under reflux at which time the theoretical amount of water, 27 ml., had been removed. The excess toluene was then removed by distillation and 145.8 grams (97.5% yield) of 2-($\beta$-di-n-butylaminoethoxy)-4,4,6-trimethyl-1,3,2-dioxaborinane was recovered as the residue. Chemical analysis of the product yielded the following data:

Calculated for $C_{16}H_{34}BNO_3$: B=3.62%, N=4.68%. Found in product: B=3.61%, N=4.69%.

VII

A mixture of 117.2 grams (1.00 mole) of N,N-diethyl-2-aminoethanol, 118.1 grams (1.00 mole) of hexylene glycol and 61.8 grams (1.00 mole) of boric acid was placed in a 2 liter round-bottomed flask containing 400 ml. of toluene. The flask was equipped with a packed distillation column fitted with a reflux condenser and a Dean-Stark trap. The mixture was stirred (magnetically) and heated under reflux for about 10.25 hours at which time 54.0 ml. (100%) of the theoretical quantity of water had collected in the trap. The excess toluene was removed by distillation and 222 grams (91.3%) of 2-(β-diethylaminoethoxy) - 4,4,6 - trimethyl - 1,3,2 - dioxaborinane was recovered, B.P. 147–149.5° C. (20 mm.), $n_D$ (25.3° C.)=1.436. Chemical analysis of the product yielded the following data:

Calculated for $C_{12}H_{26}BNO_3$: B=4.46%, N=5.73%.
Found in product: B=4.83%, N=5.76%.

(VIII)

A mixture of 117.2 grams (1.0 mole) of N,N-diethyl-2-aminoethanol, 61.84 grams (1.0 mole) of boric acid and 90.12 grams (1.0 mole) of 1,4-butanediol was placed in a 2 liter round-bottomed flask containing 500 ml. of toluene. The flask was equipped with a reflux condenser, a Dean-Stark trap and a magnetic stirrer, and was heated for about 6 hours under reflux at which time the theoretical amount of water, 54 ml., had been removed. The excess toluene was then removed by distillation and 189.0 grams (88.0% yield) of 2-(β-diethylaminoethoxy)-1,3,2-dioxaborepane was recovered as the residue. Chemical analysis of the product yielded the following data:

Calculated for $C_{10}H_{22}BNO_3$: B=5.03%, N=6.51%.
Found in product: B=4.79%, N=6.41%.

(IX)

A mixture of 150.2 grams (2.0 mole) of 3-aminopropanol, 69.64 grams (1.0 mole) of boron trioxide and 180.2 grams (2.0 mole) of 1,3-butanediol was placed in a 2 liter round-bottomed flask containing 300 ml. of benzene. The flask was equipped with a reflux condenser, a Dean-Stark trap and a magnetic stirrer, and was heated under reflux for about 12 to 14 hours at which time 97% of the theoretical amount of water, 52.5 ml., had been removed. The excess benzene was then removed by distillation and 342 grams (99.0% yield) of 2-(α-aminopropoxy)-4-methyl-1,3,2-dioxaborinane was recovered as the residue. Chemical analysis of the product yielded the following data:

Calculated for $C_7H_{16}BNO_3$: B=6.25%, N=8.10%.
Found in product: B=6.16%, N=8.06%.

(X)

A mixture of 58.6 grams (0.50 mole) of N-t-butyl-2-aminoethanol, 30.92 grams (0.50 mole) of boric acid and 38.05 grams (0.50 mole) of 1,3-propanediol was placed in a 1 liter flask containing 250 ml. of isooctane. The flask was equipped with a reflux condenser, a Dean-Stark trap and a magnetic stirrer and was heated for about 5.5 hours under reflux at which time the theoretical amount of water, 27 ml., had been removed. The excess isooctane was then removed by distillation and 95 grams (94.5% yield) of 2-(β-t-butylaminoethoxy)-1,3,2-dioxaborinane was recovered as the residue. Chemical analysis of the product yielded the following data:

Calculated for $C_9H_{20}BNO_3$: B=5.38%, N=6.97%.
Found in product: B=5.17%, N=7.24%.

(XI)

A mixture of 75.1 grams (1.0 mole) of 1-amino-2-propanol, 61.84 grams (1.0 mole) of boric acid and 118.2 grams (1.0 mole) of 2-methyl-2,4-pentanediol was placed in a 2 liter round-bottomed flask containing 400 ml. of toluene. The flask was equipped with a reflux condenser, a Dean-Stark trap and a magnetic stirrer, and was heated for about 16 hours under reflux at which time the theoretical amount of water, 54 ml., had been removed. The excess toluene was then removed by distillation and 193.0 grams (96% yield) of 2-(β-aminoisopropoxy)-4,4,6-trimethyl-1,3,2-dioxaborinane was recovered as the residue. Chemical analysis of the product yielded the following data:

Calculated for $C_9H_{20}BNO_3$: B=5.38%, N=6.97%.
Found in product: B=5.21%, N=7.31%.

(XII)

A mixture of 75.1 grams (1 mole) of N-methyl-2-aminoethanol, 34.82 grams (0.50 mole) of boron trioxide and 118.2 grams (1.0 mole) of 2-methyl-2,4-pentanediol was placed in a 2 liter round-bottomed flask containing 400 ml. of xylene. The flask was equipped with a reflux condenser, a Dean-Stark trap and a magnetic stirrer, and was heated for about 8 hours under reflux at which time the theoretical amount of water, 27 ml., had been removed. The excess xylene was then removed by distillation and 187.0 grams (93% yield) of 2-(β-methylaminoethoxy)-4,4,6-trimethyl-1,3,2-dioxaborinane was recovered as the residue. Chemical analysis of the product yielded the following data:

Calculated for $C_9H_{20}BNO_3$: B=5.38%, N=6.97%.
Found in product: B=5.13%, N=7.29%.

(XIII)

A mixture of 100 grams (1.12 mole) of N-ethyl-2-aminoethanol, 49 grams (1.11 mole) of metaboric acid and 115 grams (1.11 mole) of 2,4-pentanediol was placed in a 2 liter round-bottomed flask containing 400 ml. of heptane. The flask was fitted with a reflux condenser connected to a Dean-Stark trap and a magnetic stirrer. The reaction mass was heated under reflux for about 6 hours, at which time 40 ml. (theoretical amount) of water was collected in the trap. The excess heptane was removed by distillation and 208 grams (93%) of N-ethyl-2-aminoethyl-2,4-dimethyl-1,3,2-dioxaborinane was recovered as the residue. Chemical analysis of the product yielded the following data:

Calculated for $C_9H_{20}BNO_3$: B=5.38%, N=6.96%.
Found in product: B=5.42%, N=6.89%.

As noted previously the compounds of the present invention are excellent curing agents for epoxy resins. We have found that from about 2% to about 50%, based on the weight of the epoxy resin of a compound of the present invention will induce curing and result in a superior cured epoxy resin composition.

It is sometimes desirable to add other materials to the resin composition in order to impart certain desired characteristics. It will be found that such additives do not interfere with the action of the present compounds as curing agents. Reinforcing materials such as glass, mineral or metal fibers add strength and decrease shrinkage when the composition is cured; inert granular materials such as mica, asbestos or iron oxide lower the overall cost of the finished product; thixotropic agents such as bentonite and silica thicken liquid epoxy compositions so they can be applied to a vertical surface and cured in place; and coloring agents such as titanium dioxide, cadmium pigments and organic dyestuffs overcome the amber color usually associated with cured epoxy resin compositions. These and other similar materials known to the art can be used in combination with the present compounds to produce cured epoxy resin compositions.

The present compounds can be used as curing agents for any of the known reactive polyepoxides. These epoxy resins or reaction polyepoxides are compounds or mixtures of compounds, the average molecule of which contains more than one 1,2-epoxy groups,

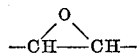

arranged in either one or more open chain, aromatic or cyclic structures. Owing to the methods for preparing the reactive polyepoxides, and the fact that they are sometimes a mixture of chemical compounds having different structures, and containing some groups which are not converted to 1,2-epoxy groups, the number of epoxy groups in an average molecule of the product is not necessarily a whole number. However, in all instances the number of epoxy groups must be greater than one.

There are four major classes of reaction polyepoxide resins:

(1) Glycidyl ethers—derived from dihydric phenols such as the condensation product of bisphenol A and epichlorohydrin or derived from polyhydric phenols such as phenol-formaldehyde condensation products, or derived from polyols such as glycols and glycerol;

(2) Epoxidized unsaturated glycerides and abietic acid derivatives—such as epoxidized soybean oil, linseed oil and tall oil;

(3) Epoxidized polyolefins—such as epoxidized polybutadiene and polyisoprene; and (4) Epoxidized cyclopolyolefins—such as epoxidized dicyclopentadiene, vinylcyclohexene and other Diels-Alder reaction products.

It is to be clearly understood that the compounds of the present invention are applicable as curing agents for any of the reactive polyepoxide resins of the foregoing defined classes.

The following examples are illustrative of the use of the present compounds as curing agents for epoxy resin compositions.

(XIV)

2-($\beta$-diethylaminoethoxy)-4,4,6-trimethyl-1,3-dioxa-2-borinane, chlorinated biphenyl, antimony oxide and an aromatic glycidyl ether epoxy resin (condensation product of bisphenol A and epichlorohydrin) were thoroughly mixed in an amount equivalent to 10 parts of the borinane, 10 parts of the biphenyl and 5 parts of the antimony oxide per 100 parts of the epoxy resin by weight. The composition was cured at 125° C. for 2 hours. The resultant cured product was a hard, self-extinguishing, flame-retardant resin which had a heat distortion temperature of 82° C.

The same composition when cured at 120° C. for 18 hours had a heat distortion temperature of 111° C. and a Shore D hardness of 90.

(XV)

2-($\beta$-dimethylaminoethoxy)-4-methyl-1,3-dioxa-2-borinane and an aromatic glycidyl ether epoxy resin (condensation product of bisphenol A and epichlorohydrin) were thoroughly mixed in an amount equivalent to 10 parts of the borinane per 100 parts of the epoxy resin by weight. The composition was cured at 120° C. for 15¾ hours and the resultant product was a clear, strong, hard, flame-resistant casting which had a heat distortion temperature of 139° C. and a Shore D hardness of 92.

(XVI)

2-($\beta$-dimethylaminoethoxy)-4-methyl-1,3-dioxa-2-borinane and an epoxy novolac resin (condensation product of a novolac resin and epichlorohydrin) were thoroughly mixed in an amount equivalent to 10 parts of the borinane per 100 parts of the epoxy resin by weight. The composition was cured for 15½ hours at 120° C. The resultant casting had extremely good impact resistance, a heat distortion temperature of 145° C., and a Shore D hardness of 94.

Other modes of applying the principle of the invention may be employed, change being made as regards the details described, provided the features stated in any of the following claims be employed.

We therefore, particularly point out and distinctly claim as our invention:

1. Aminoalkyl glycol monoborate esters having the formula

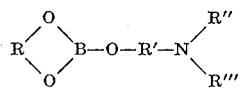

where R is an alkylene radical of from 2 to 4 carbon atoms in length and containing a total of from 2 to 20 carbon atoms, R' is an alkylene radical of from 2 to 3 carbon atoms in length and containing a total of from 2 to 4 carbon atoms, and R'' and R''' are selected from the group consisting of hydrogen and alkyl radicals of from 1 to 18 carbon atoms.

2. Aminoalkyl glycol monoborate esters having the formula

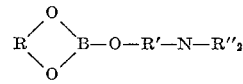

where R is an alkylene radical of from 2 to 4 carbon atoms in length and containing a total of from 2 to 20 carbon atoms, R' is an alkylene radical of from 2 to 3 carbon atoms in length and containing a total of from 2 to 4 carbon atoms, and R'' is an alkyl radical of from 1 to 18 carbon atoms.

3. Aminoalkyl glycol monoborate esters having the formula

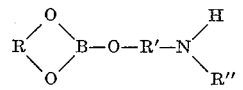

where R is an alkylene radical of from 2 to 4 carbon atoms in length and containing a total of from 2 to 20 carbon atoms, R' is an alkylene radical of from 2 to 3 carbon atoms in length and containing a total of from 2 to 4 carbon atoms, and R'' is an alkyl radical of from 1 to 18 carbon atoms.

4. Aminoalkyl glycol monoborate esters having the formula

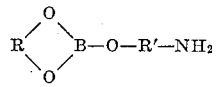

where R is an alkylene radical of from 2 to 4 carbon atoms in length and containing a total of from 2 to 20 carbon atoms and R' is an alkylene radical of from 2 to 3 carbon atoms in length and containing a total of from 2 to 4 carbon atoms.

5. 2-($\beta$-dimethylaminoisopropoxy)-4,5-dimethyl-1,3,2-dioxaborolane.

6. 2-($\beta$-dimethylaminoethoxy)-4-methyl-1,3,2-dioxaborinane.

7. 2-($\beta$-diethylaminoethoxy)-4,4,6-trimethyl-1,3,2-dioxaborinane.

8. 2-($\gamma$-aminopropoxy)-4-methyl-1,3,2-dioxaborinane.

9. 2-($\beta$-methylaminoethoxy)-4,4,6-trimethyl-1,3,2-dioxaborinane.

10. 2-($\beta$-diisopropylaminoethoxy)-1,3,2-dioxaborolane.

11. 2-($\beta$-di-n-butylaminoethoxy)-4-methyl-1,3,2-dioxaborinane.

12. 2-($\beta$-dimethylaminoethoxy)-4,4,6-trimethyl-1,3,2-dioxaborinane.

13. 2-($\beta$-diethylaminoethoxy)-1,3,2-dioxaborepane.

References Cited by the Examiner

UNITED STATES PATENTS

| | | | |
|---|---|---|---|
| 2,500,600 | 3/1950 | Bradley | 260—47 |
| 2,941,981 | 6/1960 | Elbling et al. | 260—47 |
| 2,953,545 | 9/1960 | Finestone | 260—47 |
| 2,961,459 | 11/1960 | Spike | 260—462 |
| 2,979,459 | 4/1961 | Darling et al. | 260—462 X |
| 2,990,423 | 6/1961 | Miller | 260—462 |
| 3,000,925 | 9/1961 | Rudner et al. | 260—462 |

OTHER REFERENCES

Gerrard, "The Organic Chemistry of Boron," Academic press, 1961, page 5.

CHARLES B. PARKER, *Primary Examiner.*

LOUISE P. QUAST, *Examiner.*

A. LIEBERMAN, DELBERT R. PHILLIPS,
*Assistant Examiners.*